United States Patent
Bollapragada et al.

(10) Patent No.: US 9,008,892 B2
(45) Date of Patent: Apr. 14, 2015

(54) SYSTEM, METHOD, AND APPARATUS FOR SCHEDULING AIRCRAFT MAINTENANCE EVENTS

(71) Applicant: General Electric Company, Schenectady, NY (US)

(72) Inventors: Srinivas Bollapragada, Niskayuna, NY (US); Jon David Petersen, Clifton Park, NY (US); Weiwei Chen, Clifton Park, NY (US); Mark Thomas Harrington, Tewkesbury (GB)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/939,009

(22) Filed: Jul. 10, 2013

(65) Prior Publication Data

US 2015/0019065 A1    Jan. 15, 2015

(51) Int. Cl.
*G01M 17/00* (2006.01)
*G06F 11/30* (2006.01)
*B64C 1/00* (2006.01)
*B64F 5/00* (2006.01)

(52) U.S. Cl.
CPC .................................. *B64F 5/0081* (2013.01)

(58) Field of Classification Search
USPC ................. 701/29.1, 400–541; 702/183–185; 244/117 R
See application file for complete search history.

(56) References Cited

U.S. PATENT DOCUMENTS

| | | | |
|---|---|---|---|
| 6,885,921 B1* | 4/2005 | Farmer ........................ | 701/29.1 |
| 7,006,903 B2 | 2/2006 | Smith et al. | |
| 7,340,405 B1* | 3/2008 | Gunther et al. .................... | 705/6 |
| 7,349,825 B1* | 3/2008 | Williams et al. .............. | 702/182 |
| 7,440,906 B1* | 10/2008 | Wetzer et al. ................ | 705/7.12 |
| 7,668,744 B2 | 2/2010 | Tiourine et al. | |
| 7,684,936 B2* | 3/2010 | Bechhoefer ..................... | 702/34 |
| 7,937,280 B1* | 5/2011 | Leung et al. ..................... | 705/6 |
| 8,019,504 B2* | 9/2011 | Jamrosz et al. ............. | 701/32.1 |
| 8,073,726 B1 | 12/2011 | Liu et al. | |
| 2003/0167110 A1 | 9/2003 | Smith et al. | |
| 2005/0027579 A1 | 2/2005 | Tiourine et al. | |
| 2005/0055239 A1* | 3/2005 | Farmer ............................. | 705/1 |

(Continued)

OTHER PUBLICATIONS

Mahadevan et al.; "Handling Real-Time Scheduling Exceptions Using Decision Support Systems"; Systems, Mans And Cybernetics, 2003. IEEE International Conference On; Oct. 5-8, 2003; vol. 1, pp. 931-936.

*Primary Examiner* — Thomas G Black
*Assistant Examiner* — Tyler Paige
(74) *Attorney, Agent, or Firm* — John P. Darling (57) ABSTRACT

Systems, methods, and apparatuses for scheduling aircraft maintenance events. One system includes a user interface and at least one processor. The system is configured to receive an indication that an unscheduled maintenance event for an aircraft is to be scheduled, and to determine, using the at least one processor, a maintenance schedule for completing the unscheduled maintenance event on the aircraft, a modified flight schedule for the aircraft, and a modified aircraft schedule for the aircraft based on the unscheduled maintenance event, an initial flight schedule, an initial aircraft schedule, and at least one selectable parameter indicative of user preferences to reduce a total cost of operating the at least one aircraft. The system is configured to provide at least one of the maintenance schedule, the modified flight schedule, and the modified aircraft schedule to the user interface.

9 Claims, 4 Drawing Sheets

(56) References Cited

U.S. PATENT DOCUMENTS

| | | |
|---|---|---|
| 2005/0071206 A1 | 3/2005 | Berge |
| 2005/0125267 A1 | 6/2005 | Bramnick et al. |
| 2006/0095156 A1 | 5/2006 | Baiada et al. |
| 2007/0112488 A1* | 5/2007 | Avery et al. ............ 701/35 |
| 2008/0010107 A1* | 1/2008 | Small et al. ............ 705/9 |
| 2008/0021604 A1* | 1/2008 | Bouvier et al. ............ 701/30 |
| 2008/0046167 A1* | 2/2008 | Small et al. ............ 701/120 |
| 2008/0162235 A1 | 7/2008 | Tomastik et al. |
| 2009/0187449 A1* | 7/2009 | van Tulder et al. ............ 705/8 |
| 2009/0288091 A1 | 11/2009 | Papadakos |
| 2010/0082383 A1 | 4/2010 | Pachon et al. |

* cited by examiner

SYSTEM, METHOD, AND APPARATUS FOR SCHEDULING AIRCRAFT MAINTENANCE EVENTS

BACKGROUND

The subject matter disclosed herein relates to aircraft and flight scheduling and, more particularly, to systems, methods, and apparatuses for scheduling aircraft maintenance events.

Unplanned and/or emergency maintenance on aircraft may be a major expense for airlines. For example, airlines may spend a substantial amount of money each year to perform unplanned and/or emergency maintenance on aircraft. Airlines may have specific geographic locations (e.g., maintenance facilities) along certain flight routes to perform maintenance on aircraft. These geographic locations often store a variety of parts for performing such maintenance. Unfortunately, suitable geographic locations may not be positioned along an aircraft's flight route to enable the aircraft to obtain unplanned and/or emergency maintenance. For example, the aircraft's flight route may not take the aircraft to a suitable geographic location for performing maintenance. As another example, a geographic location along an aircraft's flight route may not have the parts for the maintenance to be obtained. Accordingly, flight routes may become disrupted while scheduling unplanned and/or emergency maintenance on aircraft, resulting in expenses and flight delays.

BRIEF DESCRIPTION

In accordance with one embodiment, a method for scheduling at least one unscheduled maintenance event for at least one aircraft includes receiving, via at least one processor, an indication that the at least one unscheduled maintenance event for the at least one aircraft is to be scheduled. The method also includes receiving, via the at least one processor, an initial flight schedule for the at least one aircraft. The method includes receiving, via the at least one processor, an initial aircraft schedule for the at least one aircraft. The method also includes receiving, via the at least one processor, at least one selectable parameter indicative of user preferences. The method includes determining, via the at least one processor, a maintenance schedule for completing the at least one unscheduled maintenance event on the at least one aircraft, a modified flight schedule for the at least one aircraft, and a modified aircraft schedule for the at least one aircraft based on the at least one unscheduled maintenance event, the initial flight schedule, the initial aircraft schedule, and the at least one selectable parameter to reduce a total cost of operating the at least one aircraft. The method also includes providing the maintenance schedule for completing the at least one unscheduled maintenance event, the modified flight schedule for the at least one aircraft, and the modified aircraft schedule for the at least one aircraft to a user interface.

In accordance with another embodiment, an apparatus includes at least one tangible, machine-readable media having instructions encoded thereon for execution by a processor. The instructions include instructions to receive an indication that at least one unscheduled maintenance event for at least one aircraft is to be scheduled. The instructions also include instructions to receive an initial flight schedule for the at least one aircraft. The instructions include instructions to receive an initial aircraft schedule for the at least one aircraft. The instructions also include instructions to receive at least one selectable parameter indicative of user preferences. The instructions include instructions to determine a maintenance schedule for completing the at least one unscheduled maintenance event, a modified flight schedule for the at least one aircraft, and a modified aircraft schedule for the at least one aircraft based on the at least one unscheduled maintenance event, the initial flight schedule, the initial aircraft schedule, and the at least one selectable parameter to reduce a total cost of operating the at least one aircraft.

In accordance with a further embodiment, a system includes a user interface and at least one processor. The system is configured to receive an indication that an unscheduled maintenance event for an aircraft is to be scheduled, and to determine, using the at least one processor, a maintenance schedule for completing the unscheduled maintenance event on the aircraft, a modified flight schedule for the aircraft, and a modified aircraft schedule for the aircraft based on the unscheduled maintenance event, an initial flight schedule, an initial aircraft schedule, and at least one selectable parameter indicative of user preferences to reduce a total cost of operating the at least one aircraft. The system is configured to provide at least one of the maintenance schedule, the modified flight schedule, and the modified aircraft schedule to the user interface.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
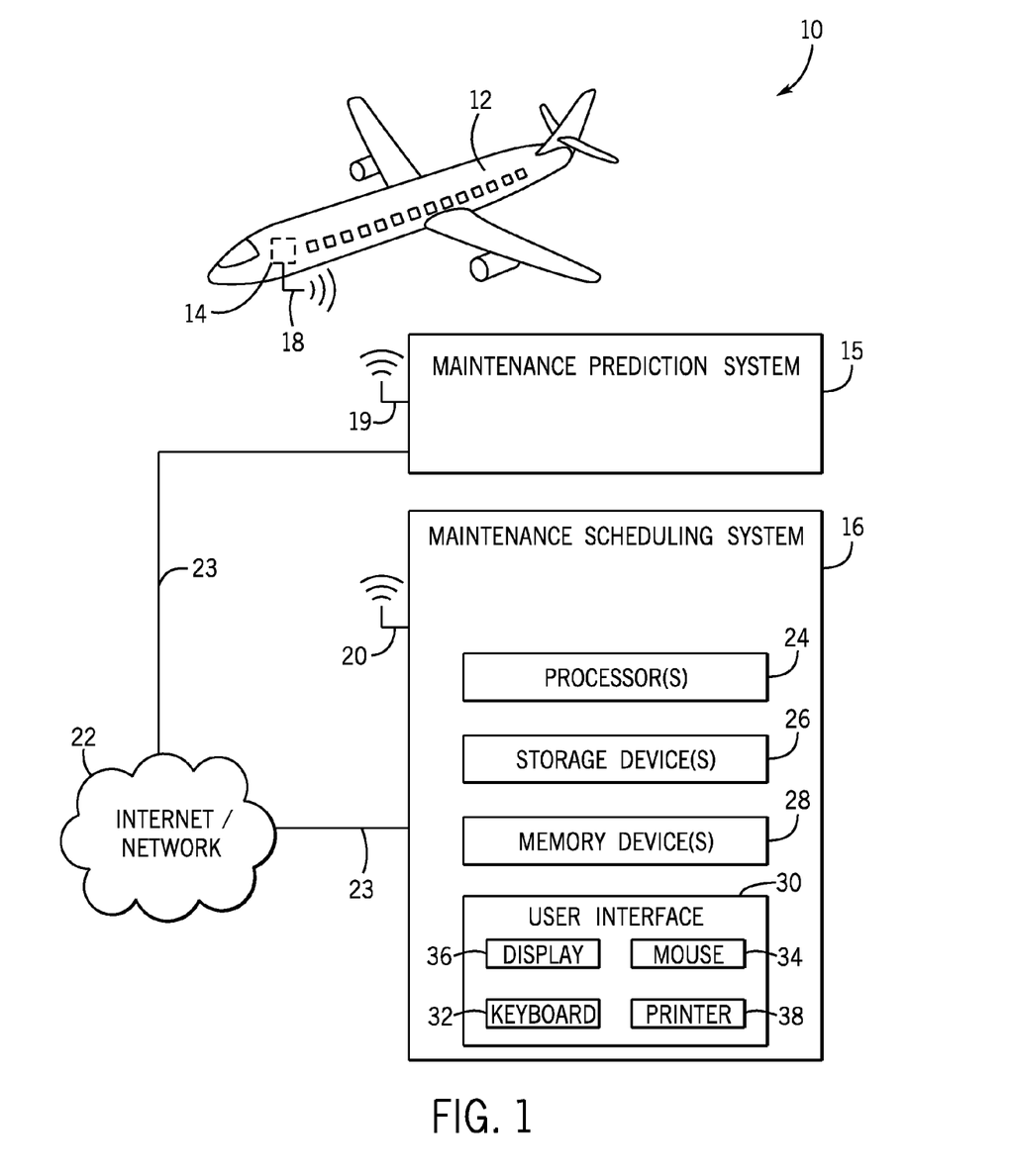
FIG. 1 is a block diagram of an embodiment of an airline system with a maintenance scheduling system for scheduling unscheduled maintenance events.

FIG. 1 is a block diagram of an embodiment of an airline system 10 with a maintenance scheduling system for scheduling unscheduled maintenance events. The airline system 10 includes an aircraft 12, which represents multiple aircraft that may be present in the airline system 10. The aircraft 12 includes a detection device 14 that is configured to gather data corresponding to the operation of various components of the aircraft 12 (e.g., data corresponding to component wear). The airline system 10 also includes a maintenance prediction system 15 that is configured to receive the data gathered by the detection device 14, and to predict potential maintenance issues with the aircraft 12 based on the data. The maintenance prediction system 15 includes software that is used to predict the potential maintenance issues before operation of the aircraft 12 is interrupted by the maintenance issues, and to determine unscheduled maintenance that may be performed on the aircraft 12 to resolve the maintenance issues. In certain embodiments, the maintenance prediction system 15 may determine a prioritized list of unscheduled maintenance that may be performed on the aircraft 12 and/or a time window in which the unscheduled maintenance may be performed to resolve the maintenance issues. As may be appreciated, in some embodiments, the maintenance prediction system 15 may be included with the detection device 14.

The maintenance prediction system 15 may output a prediction of potential maintenance issues in conjunction with an uncertainty that relates to the prediction. The output of the maintenance prediction system 15 may include a subsystem that may receive maintenance and/or a probability that the maintenance should be performed as a function of time (e.g., elapsed time), number of flight cycles (e.g., take-offs or landings), and/or a number of flight hours. For example, an output of the maintenance prediction system 15 may indicate that there is a 30% chance that a thrust reverser would become inoperable if not maintained within 24 hours, a 60% chance that the thrust reverser would become inoperable if not maintained within 36 hours, and a 90% chance that the thrust reverser would become inoperable if not maintained within 3 days.

As used herein, the phrase "unscheduled maintenance" means a desired repair resulting from an anomaly detected by a diagnostic or prognostic technology (e.g., the detection device 14) that is not scheduled to occur within a defined time period. In certain embodiments, information associated with an unscheduled maintenance event may include an identified aircraft, a set of eligible maintenance locations, an estimated maintenance duration at each maintenance location, a maximum number of flying hours before the next maintenance action is desired, and a maximum number of cycles (e.g., takeoffs or landings) before the next maintenance action is desired.

Using the predicted potential maintenance issues from the maintenance prediction system 15, a maintenance scheduling system 16 is used to schedule any unscheduled maintenance events. The maintenance scheduling system 16 uses a variety of inputs and criteria to determine whether to reroute aircraft, delay flights, cancel flights, reassign crews to different flights, reroute passengers, and so forth. By scheduling the unscheduled maintenance events, certain emergency repairs may be avoided. Furthermore, rerouted aircraft, delayed flights, cancelled flights, crew reassignments, and/or passenger changes may be reduced, thereby reducing airline costs. For example, the maintenance scheduling system 16 may enable an airline to optimally route aircraft to maintenance locations so that maintenance can be performed on the aircraft before the aircraft becomes inoperable.

In certain embodiments, the maintenance scheduling system 16 may compare costs associated with rerouting aircraft to allow for maintenance within a certain time frame with an anticipated cost incurred for not fixing potential maintenance issues during that time. For example, the cost of rerouting aircraft to fix a thrust reverser problem within 24 hours may be $50,000 and the cost incurred if the thrust reverser becomes inoperable within 24 hours because of not being maintained may be $100,000. Moreover, the cost comparison may be viewed in conjunction with the probability of failure within 24 hours (e.g., 30%). In this example, the cost of failure (e.g., $100,000) times the probability of failure (e.g., 30%) is $30,000. As such, $30,000 is less than $50,000, so it may not be cost effective to perform the maintenance within 24 hours. This same type of analysis may be performed for other maintenance time periods, such as until performing the maintenance procedure becomes cost effective. When performing the maintenance procedure is cost effective, a new flight schedule may be developed accordingly.

The detection device 14, the maintenance prediction system 15, and the maintenance scheduling system 16 may communicate wirelessly using wireless devices 18, 19, and 20. Furthermore, the maintenance prediction system 15 and the maintenance scheduling system 16 may communicate with a network 22 (e.g., the Internet) using a wired connection 23.

The maintenance scheduling system 16 includes one or more processors 24, storage devices 26, and memory devices 28. The processor(s) 24 may be used to execute software, such as aircraft scheduling software, maintenance scheduling software, and so forth. Moreover, the processor(s) 24 may include one or more microprocessors, such as one or more "general-purpose" microprocessors, one or more special-purpose microprocessors and/or application specific integrated circuits (ASICS), or some combination thereof. For example, the processor(s) 24 may include one or more reduced instruction set (RISC) processors.

The storage device(s) 26 (e.g., nonvolatile storage) may include read-only memory (ROM), flash memory, a hard drive, or any other suitable optical, magnetic, or solid-state storage medium, or a combination thereof. The storage device(s) 26 may store data (e.g., flight data, aircraft data, maintenance data, etc.), instructions (e.g., software or firmware for determining scheduling, etc.), and any other suitable data.

The memory device(s) 28 may include a volatile memory, such as random access memory (RAM), and/or a nonvolatile memory, such as ROM. The memory device(s) 28 may store a variety of information and may be used for various purposes. For example, the memory device(s) 28 may store processor-executable instructions (e.g., firmware or software) for the processor(s) 24 to execute, such as instructions for a maintenance scheduling software.

The maintenance scheduling system 16 includes one or more user interface 30 devices. In the illustrated embodiment, the user interface includes a keyboard 32 and a mouse 34 for inputting data, making selections, and/or operating the maintenance scheduling system 16. Furthermore, the user interface 30 includes a display 36 to show data, such as data corresponding to maintenance schedules. The user interface 30 also includes a printer 38 for printing data, such as for printing maintenance schedules.

Figure 2:
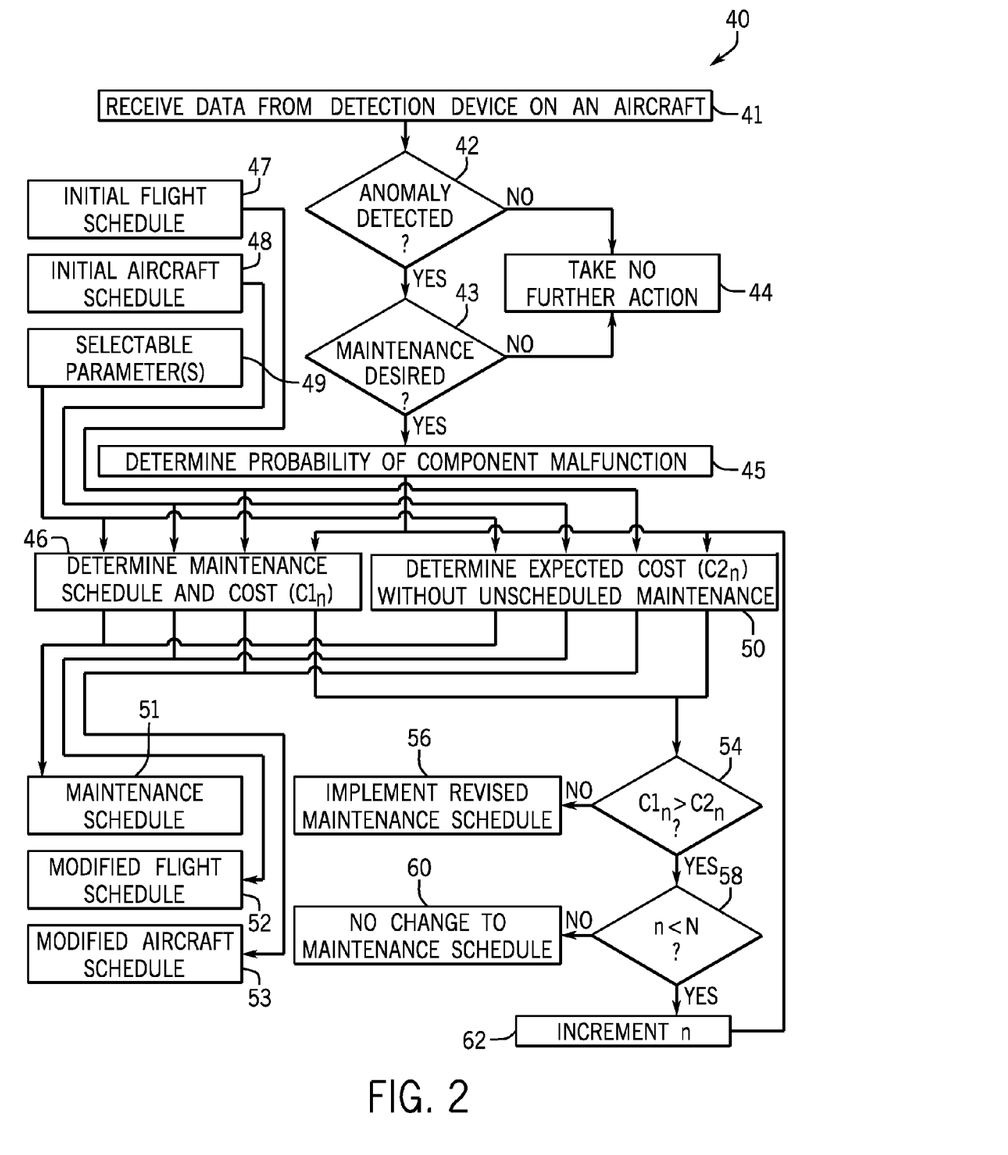
FIG. 2 is a flow diagram of an embodiment of a method for managing unscheduled maintenance events.

FIG. 2 is a flow diagram of an embodiment of a method 40 for handling unscheduled maintenance events. The maintenance prediction system 15 (or some other system, such as the maintenance scheduling system 16) receives data from the detection device 14 on the aircraft 12 (block 41). The maintenance prediction system 15 determines whether an anomaly has been detected on the aircraft 12 (block 42). If an anomaly is detected, the maintenance prediction system 15 may estimate a desired time of component repair/replacement and/or a likelihood of component wear beyond a desired limit. The maintenance prediction system 15 and/or the maintenance scheduling system 16 uses the desired time of component repair/replacement and/or the likelihood of component wear beyond a desired limit to determine whether maintenance is desired (block 43). For example, certain anomalies may not affect the operation of the aircraft 12, while other anomalies may negatively affect the operation of the aircraft 12. If maintenance is not desired for a certain anomaly, no further action is taken for that anomaly (block 44). Furthermore, if no anomaly is detected, no further action is taken.

If an anomaly is likely to affect the operation of the aircraft 12, an indication that an unscheduled maintenance event for the aircraft 12 is to be scheduled is provided to the maintenance scheduling system 16. For example, a maintenance procedure for the aircraft 12 and a time period during which the maintenance procedure is to be completed on the aircraft 12 may be provided to the maintenance scheduling system 16.

The maintenance scheduling system 16 uses the indication that the unscheduled maintenance event is to be scheduled to determine a probability of component malfunction (block 45). For example, the maintenance scheduling system 16 may compute a probability of component malfunction as a function of usage of the component. In certain embodiments, usage cycles or intervals may be measured as elapsed time, flight hours, a number of flight cycle portions (e.g., take-offs, landings, etc.), and/or a number of compute flight cycles (e.g., a take-off and landing viewed together). Moreover, the usage may depend on the component involved. In one example, $P_n$ may represent the probability of malfunction for a particular usage interval n less than $U_n$, and N+1 may be a number of usage intervals. For the algorithm that follows, n may initially be set to 1.

Furthermore, the maintenance scheduling system 16 determines a maintenance schedule for completing the unscheduled maintenance event (e.g., such as before $U_n$) (block 46). In certain embodiments, the maintenance scheduling system 16 may determine a cost to implement the maintenance schedule (e.g., $C1_n$). Furthermore, an initial flight schedule 47 (e.g., for the aircraft 12), an initial aircraft schedule 48 (e.g., for the aircraft 12), and selectable parameter(s) 49 (e.g., at least one selectable parameter indicative of user preferences, such as airline preferences, military preferences, cargo preferences, corporate preferences, and so forth) are provided to the maintenance scheduling system 16 to enable the maintenance scheduling system 16 to schedule the unscheduled maintenance event. The selectable parameter(s) 49 are provided to the maintenance scheduling system 16 because different airlines and/or users within an airline may desire different scheduling priorities. For example, one airline may desire to cancel a flight rather than incur a three hour delay, while another airline may not.

The selectable parameter(s) 49 may include system parameters that govern software and inputs to a model used to schedule the unscheduled maintenance events, penalty parameters that define an objective to be reduced, constraint parameters that tune constrains of the model, functional parameters that determine constraints used by the software, and performance parameters that affect the runtime of the model. As may be appreciated, certain combinations of parameter selections may improve solution quality, but increase runtime, while other combinations of parameter selections may decrease runtime, but decrease solution quality.

The system parameters may include at least one of the following: a beginning of a time window, an end of the time window, a decision to use an open source mixed integer programming solver, a decision to use a commercial solver (e.g., Gurobi™ solver developed by Gurobi Optimization, Inc. of Houston, Tex.), a decision to use a branch-and-price algorithm, an extended time window for maintenance events, and a maximum allowable delay for the initial schedule. As used herein, the term "time window" means a continuous interval provided by a user, or computed by an algorithm, that defines the time for which schedule, aircraft and maintenance decisions may be modified from an initial schedule. Activities outside the time window are preserved.

Furthermore, the penalty (e.g., cost) parameters may include at least one of the following: a flight cancellation policy (e.g., a flight cancelation cost), a per minute flight delay penalty (e.g., a per minute flight delay cost), a fixed cost of a ferry flight, a per minute ferry flight penalty (e.g., per minute ferry flight cost), a route integrity penalty, a scheduled maintenance integrity penalty, a penalty for aircraft swap along a route, a penalty for aircraft swap at an initial location, a fixed cost for spare aircraft utilization, a penalty for new route utilization, an unassigned aircraft penalty, and a penalty for a diverted flight (e.g., a flight diversion cost). As used herein, the term "scheduled maintenance event" means a maintenance event that is already contained in the scheduled routing for an aircraft prior to a model being solved. Furthermore, the term "route" means an ordered sequence of events (e.g., flight legs, maintenance events, ferry flights, etc), with possible re-timing decisions, to be operated by a specified aircraft. Because routes may have different timing decisions, a particular sequence of activities may have many repercussions corresponding to different delay decisions for that sequence. The term "string" means an ordered sequence of events (e.g., flight legs, maintenance events, ferry flights, etc), with possible re-timing decisions, to be operated by a non-specified aircraft. Moreover, the term "ferry flight" means a flight leg to be flown with no passengers on board. These types of flights may be used when an irregularity occurs to position an aircraft for a subsequent event. The term "unassigned aircraft" means an aircraft in which the maintenance scheduling system 16 cannot assign to a route, even a null route. This may occur if the aircraft has a specified beginning and end location for which no path exists. In addition, the term "null route" means a route that does not contain an activity. An aircraft may be assigned to a null route if the initial location at the beginning of a time window is an eligible end location at the end of the time window.

Moreover, the constraint parameters may include a decision to impose one or more of the following: flight cover constraints (e.g., ensuring that every flight is contained in precisely one selected route, or is to be canceled), aircraft assignment constraints (e.g., ensuring that every aircraft is either assigned to precisely one route, or is to remain on the ground throughout the decision horizon), location balance constraints (e.g., ensuring that a proper number of aircraft by fleet type are delivered to each station by the end of the decision), aircraft positioning constraints (e.g., ensuring each individual aircraft is delivered to a specified station), departure flow rate constraints, arrival flow rate constraints, gate constraints, strategic flight constraints (e.g., blocking a certain subset of flight legs from being canceled), curfew constraints (e.g., ensuring a number of arrivals and departures do not exceed those specified by specified curfew limits), equipment-flight enforcements (e.g., blocking certain equipment types from being assigned to certain flight legs), equipment-location enforcements, equipment-sector enforcements (e.g., blocking certain equipment types from being assigned to certain sectors), aircraft-flight restrictions, aircraft-location restrictions, and aircraft-sector restrictions.

The functional parameters may include one or more of the following: a decision to allow pre-maintenance swaps, a decision to allow post-maintenance swaps, a maximum allowable flight delay, a decision to allow flight delays, a decision to allow flight cancellations, a decision to allow ferry flights, a decision to allow spare aircraft to re-position, a decision to allow move-up aircraft to re-position, a decision to force disrupted aircraft to terminate a flight at a maintenance location, a decision to allow cross-fleet swaps, a minimum flight connection time, a maximum flight connection time, a decision to allow flight delays from maintenance events, a maximum allowable delay from a maintenance event, a maximum allowable time for a ferry flight, and a decision to allow flight diversions. As used herein, the term "spare aircraft" means an aircraft with no scheduled events throughout a specified time window. Moreover, the term "disrupted aircraft" means an aircraft that contains an unscheduled maintenance event. Furthermore, the term "move-up aircraft" means an aircraft that is not disrupted, but may interchange one or more of its scheduled activities with one or more from a disrupted aircraft. Move-up aircraft may be used to mitigate irregular operations. In addition, the term "disruptable aircraft" means any aircraft that is eligible to have an activity rescheduled to accommodate the disruption. The set of disruptable aircraft include all disrupted aircraft, move-up aircraft, and spare aircraft.

Moreover, the performance parameters may include one or more of the following: a maximum number of initial routes to generate, a maximum number of flights to generate per route, a search horizon for move-up aircraft selection, a maximum number of move-up aircraft allowed per disrupted aircraft, a maximum number of spare aircraft allowed per disrupted aircraft, a maximum allowable runtime for the maintenance scheduling system 16, and a maximum number of columns to generate in a column generation step.

The maintenance scheduling system 16 may also use the probability of failure (e.g., $P_n$), the initial flight schedule 47, the initial aircraft schedule 48, and/or the selectable parameter(s) 49 to determine a maximum cost (e.g., $C2_n$) of malfunction from non-maintenance occurring during a time interval (e.g., $U_n$, $U_{n+1}$) (block 50). As may be appreciated, the maximum cost may include the cost of emergency repair and/or schedule recovery. In addition to determining the maintenance schedule for completing the unscheduled maintenance event on the aircraft 12, the maintenance scheduling system 16 also may determine a modified flight schedule for the aircraft and/or a modified aircraft schedule for the aircraft. Furthermore, the maintenance scheduling system 16 may provide the maintenance schedule (block 51), the modified flight schedule (block 52), and the modified aircraft schedule (block 53) to the user interface 30. As may be appreciated, in certain embodiments, the maintenance schedule, the modified flight schedule, and/or the modified aircraft schedule may be processed so that the schedules are coherent and/or consistent with one another. As used herein, the term "maintenance schedule" means a schedule for one or more aircraft with at least one maintenance event. The maintenance schedule may be for a set of aircraft, and may include previously scheduled maintenance events. Moreover, the maintenance scheduling system 16 may determine and/or provide unassigned maintenance events. The term "unassigned maintenance events" means any maintenance event for an aircraft that is not assigned to a route.

As used herein, the term "initial flight schedule" means an initial schedule specifying certain elements for each flight leg, such as planned departure and arrival times, origin and destination airports, scheduled cabin and cockpit crew members, and passenger information (e.g., number of passengers, itineraries, connecting flight legs, etc.). Moreover, the term "modified flight schedule" means a schedule that includes a list of flight legs that may be executed with modified departure times (e.g., delays—flights may not depart prior to an initial flight schedule departure time) and/or a list of flight legs that may be canceled.

Furthermore, as used herein, the term "initial aircraft schedule" means an initial schedule which includes at least one of a sequence of flights to be operated, scheduled maintenance events, constraints, and/or conditions associated with each scheduled, unscheduled, and/or unassigned maintenance event. The term "modified aircraft schedule" means a schedule that includes a list of aircraft with possibly modified routes, a list of possibly modified maintenance events, and/or a list of aircraft which cannot be assigned to a route. The possibly modified routes may be approved by a user to be actual modified routes.

In certain embodiments, the cost of performing the unscheduled maintenance (e.g., $C1_n$) may be compared with the cost of not performing the unscheduled maintenance within a predetermined time period (e.g., $C2_n$) (block 54). If the cost of performing the unscheduled maintenance is less than the expected cost of not performing the unscheduled maintenance within the predetermined time period, a decision is made to implement the revised maintenance schedule for performing the unscheduled maintenance (block 56). However, if the cost of performing the unscheduled maintenance is greater than the expected cost of not performing the unscheduled maintenance within the predetermined time period, it is determined whether all possible usage intervals have been examined (e.g., is n<N?) (block 58). If all usage intervals have been examined, no change is made to the maintenance schedule (block 60). However, if all usage intervals have not been examined, the next usage interval is analyzed, such as by first incrementing n (block 62), then returning to blocks 46 and 50 to analyze additional usage intervals.

While this method 40 describes various data provided to or determined by the maintenance scheduling system 16, it may be appreciated that one or more processors 24 of the maintenance scheduling system 16 may receive the data provided to the maintenance scheduling system 16 and may determine the schedules. Using the method 40, the maintenance scheduling system 16 may be used to reschedule aircraft operations to deliver disrupted aircraft to a maintenance location for maintenance before the expiration of a maintenance window. Furthermore, the maintenance scheduling system 16 may be used to determine changes to an initial flight schedule and to an initial aircraft schedule that will enable completion of unscheduled maintenance events while reducing the cost incurred by an airline. Accordingly, using the maintenance scheduling system 16, an airline may be able to mitigate disruptions through proactive scheduling, thereby reducing airline costs.

Figure 3:
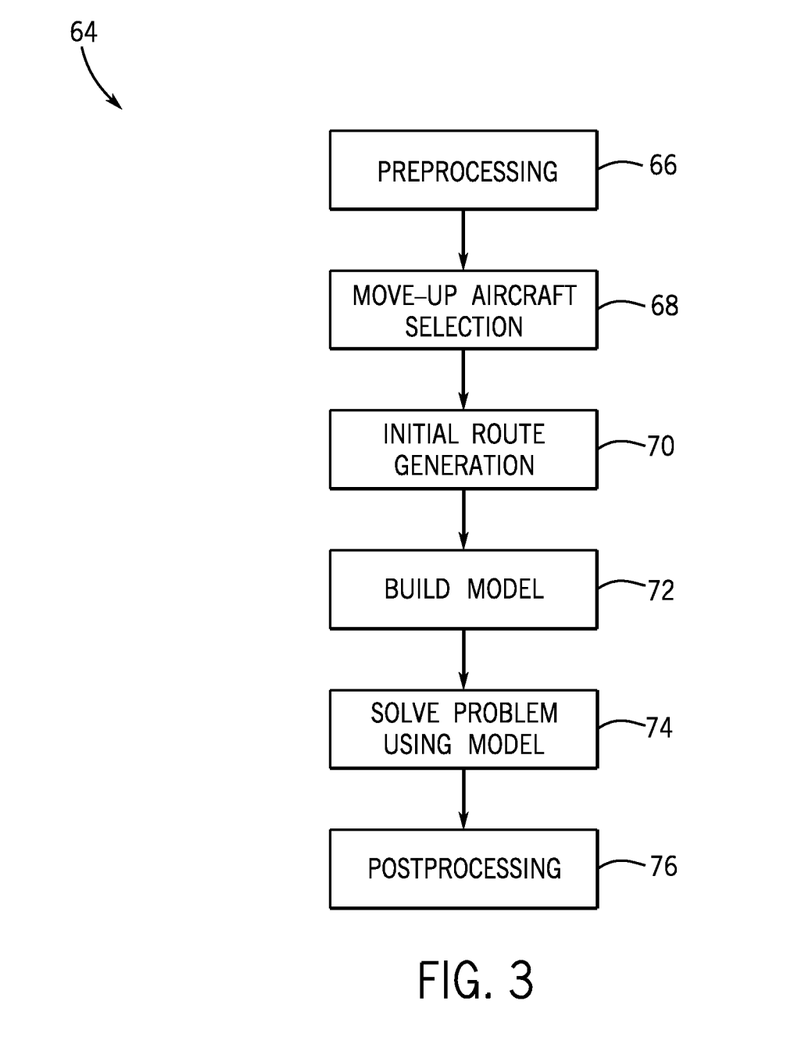
FIG. 3 is a flow diagram of an embodiment of a method for scheduling unscheduled maintenance events.

FIG. 3 is a flow diagram of an embodiment of a method 64 for scheduling unscheduled maintenance events. This method 64 may be performed by any suitable hardware and/or software. For example, software of the maintenance scheduling system 16 may perform the method 64. Accordingly, the maintenance scheduling system 16 performs preprocessing (block 66). During preprocessing, the maintenance scheduling system 16 reads input data (e.g., unscheduled maintenance events, the initial flight schedule 52, the initial aircraft schedule 54, the selectable parameter(s) 56, etc.). As may be appreciated, the input data may be cleaned up (e.g., modified to remove unneeded information, extra information, and/or duplicate information) and/or checked for consistency. Moreover, in certain embodiments, input events (e.g., flight schedule events, aircraft schedule events, etc.) that end before a beginning of a time window or begin after an end of the time window are filtered out (e.g., not analyzed, not modified, etc.) during preprocessing. Furthermore, during preprocessing, disrupted aircraft (e.g., aircraft that include an unscheduled maintenance event) may be identified.

After preprocessing, the maintenance scheduling system 16 performs a move-up aircraft selection (block 68). Specifically, using the set of disrupted aircraft, move-up aircraft are identified that may be used to swap with disrupted aircraft to reduce delays and cancellations. As may be appreciated, the time associated with determining a schedule for unscheduled maintenance events may depend on a number of aircraft analyzed by the maintenance scheduling system 16. Therefore, reducing the number of aircraft analyzed may reduce the time associated with determining a schedule for unscheduled maintenance events. Conversely, a quality of the schedule for unscheduled maintenance may be improved based on the number of aircraft analyzed. Accordingly, one of the selectable parameter(s) 56 enables an operator to select a maximum number of move-up aircraft allowed per disruption. For each disrupted aircraft, all scheduled flight legs within the selected time window are extracted and processed. Move-up aircraft are identified by selecting aircraft with flight segments that occur before the maintenance event begins (e.g., pre-maintenance aircraft swaps as described in FIG. 4) and by selecting aircraft with flight segments that occur after the maintenance event begins (e.g., post-maintenance aircraft swaps as described in FIGS. 5 and 6). Spare aircraft are also identified, such as by selecting aircraft with flight segments that occur before the maintenance event begins.

After move-up aircraft are identified, the maintenance scheduling system 16 may make move-up aircraft assignments. Each move-up aircraft is associated with a set of attributes and a cost to make the swap with a disrupted aircraft. The move-up aircraft are sorted with respect to cost in increasing order. Each move-up aircraft may be assigned to a respective disrupted aircraft in any suitable manner, such as by using sequential assignment or matching subroutines.

When using sequential assignment, the move-up aircraft are ordered for a first given disruption. In addition, the move-up aircraft may be ordered based on one of the selectable parameters 56. Accordingly, all move-up aircraft that are below a threshold (e.g., a preselected number for a numeric parameter) for the selectable parameter 56 may be assigned to the first given disruption. For a second given disruption, the remaining move-up aircraft (e.g., not assigned to the first given disruption) may be ordered based on one of the selectable parameters 56. Again, all move-up aircraft that are below a threshold for the selectable parameter 56 may be assigned to the second given disruption. This process of sequential assignment may proceed in a similar manner through all disruptions.

When using a matching subroutine, disrupted aircraft are simultaneously assigned to move-up aircraft. For example, a graph is constructed that is used to match disrupted aircraft to a selected number of move-up aircraft, thereby ensuring that each move-up aircraft is contained in no more than a selected number of disruptions and/or the number of move-up aircraft selected for each disrupted aircraft does not exceed a user-defined parameter. The matching subroutine may be solved using a mathematical programming (MP) solver that is able to solve mixed integer programming (MIP) problems. For example, the MP solver may be an open source Google™ OR solver developed by Google Inc. of Mountain View, Calif., or a Gurobi™ commercial solver. The matching problem may also be solved using a customized matching algorithm.

After the move-up aircraft selection, the maintenance scheduling system 16 performs initial route generation (block 70). As discussed previously, a disruptable set of aircraft includes all disrupted aircraft, move-up aircraft, and spare aircraft. The disruptable set of aircraft is identified during the move-up aircraft selection (block 68). When an aircraft swap introduces new routes for an aircraft, additional routes may be available. For instance, a maintenance schedule may be improved by considering a route with four different scheduled aircraft (e.g., there are multiple swaps involved in the maintenance schedule). To ensure a sufficient number of routes are generated, all scheduled flight legs are de-assigned from their initial schedule and new routes are constructed for each aircraft.

Each aircraft includes the following properties that are known from the move-up aircraft identification process: an initial location (e.g., the initial location of the aircraft when ready to be deployed), a ready time (e.g., the time at which the aircraft is ready to be deployed), eligible end locations (e.g., the scheduled end location for the aircraft, along with the scheduled end location for any aircraft which may be involved in an aircraft swap, i.e., the set of locations the aircraft may be present at the end of the time window), and an end time (e.g., the time at which the aircraft is due).

An aircraft may be assigned to a route if the following criteria are met: the route begins from the initial location of the aircraft, the first activity of the route begins after the ready time of the aircraft, the route terminates at an eligible end location, the route terminates before the end time of the aircraft route, and the route contains a maintenance opportunity for all maintenance events for the aircraft.

Routes are generated using a flight network, which may include a graphical representation of all flight legs from disruptable aircraft. Nodes on the network represent flight legs and arcs represent feasible connections between consecutive flights. Feasible connections differ according to the selectable parameters 56. Specifically, connections may be a function of a maximum allowable delay, a minimum allowable ground time, a maximum allowable ground time, and/or whether cross-fleet swaps are permitted (e.g., flights from a B737 changing with an A320). Given an aircraft's attributes, paths are generated over the network representing sequences of flight legs. Paths are generated from a depth-first search and then each path is split into one or more copies representing different delayed departure options. In certain embodiments, the depth-first search may include a search algorithm for traversing a tree or a graph (e.g., a graphical representation of the flight network). The search starts at a root node of the tree or graph and proceeds by exploring child nodes until stopping criteria is reached. Then the search backtracks to a node that hasn't been completely explored. Maintenance events may be embedded into flight routes for aircraft including a maintenance event.

Some disrupted aircraft may not have a maintenance-feasible route assigned to it from the initial route generation procedure. Accordingly, certain aircraft may include a ferry flight to get to a maintenance location. Subsequent flight legs for such aircraft may be cancelled, assigned to another aircraft, or may be assigned after a move-up aircraft takes a ferry flight to a particular location.

After the initial route generation, the maintenance scheduling system 16 builds an optimization model (block 72). The initial route generation outputs a set of eligible routes for each disruptable aircraft. Using these outputs, an optimization model is built. For example, the model may be a MIP model that seeks to produce a modified flight schedule, a modified aircraft schedule, and a maintenance schedule with a reduced cost. As may be appreciated, the model may be any suitable type of optimization model.

The optimization model may output and/or use one or more of the following components: an aggregate delay of all routes, a number of flight cancellations, a route integrity (e.g., a penalty may be added if a route is used that was not originally assigned to some aircraft), a number of swaps in a route, a maintenance integrity (e.g., a penalty may be added if a scheduled maintenance event is rescheduled), a number of unassigned aircraft, a number of unassigned maintenance events, a number of missed crew connections, and a number of missed passenger connections. Furthermore, the optimization model may attempt to reduce the components described.

Moreover, the optimization model may use one or more of the following constraints: flight cover (e.g., each flight is assigned to exactly one route, or is canceled), aircraft assignment (e.g., each aircraft is assigned to exactly one route, or is unassigned), balance and/or positioning (e.g., balance refers to delivering the same number of aircraft by equipment (fleet) as was scheduled by the end of the time window; positioning refers to delivering the exact aircraft to the originally scheduled locations by the end of the time window), departure restrictions (e.g., limiting a total number of departures to any departure restrictions defined for a given location in a given time interval, such as a departure restriction threshold), arrival restrictions (e.g., limiting a total number of arrivals to any arrival restrictions defined for a given location in a given time interval, such as an arrival restriction threshold), gate restrictions (e.g., limiting a total number of aircraft on the ground at a given time to the available gates and available stands for a given location in a given time interval, such as a gate restriction threshold), curfew restrictions (e.g., limiting any aircraft inbound to or outbound from a location with a curfew to the number of operations allowed for the curfew period, such as a curfew restriction), flight/airport/aircraft/equipment restrictions (e.g., certain restrictions across specified flights, airports, aircraft, and equipment combinations; for example, if a B747 cannot operate out of BWI, the schedule does not schedule any B747 into or out of the location through the time window), and flight/airport/aircraft/equipment enforcements (e.g., any enforcements to be met across specified flights, airports, aircraft, and equipment combinations; for example, if an aircraft travels to LAX at some point in the time window, the schedule ensures that the aircraft travels to LAX at least once).

After the optimization model is built, the maintenance scheduling system 16 uses the model to solve the scheduling problem (block 74). The scheduling problem may be solved using any open source and/or commercial solver capable of solving large MIP problems. Moreover, the scheduling problem may be solved directly through a solver without customization, or through an advanced method such as branch-and-price. As may be appreciated, using a branch-and-price method may not use a full enumeration of initial routes generated. Instead, fewer routes may be initially generated, and additional routes may be dynamically generated at nodes in the branch-and-bound tree.

After the scheduling problem is solved using the model, the maintenance scheduling system 16 performs postprocessing (block 76). For example, the maintenance scheduling system 16 may extract the maintenance schedule, the modified flight schedule, and/or the modified aircraft schedule. The schedules may be checked for validity and/or provided to a flight tracking system. An operator may have the option of accepting one or more recommended schedules, rejecting one or more recommended schedules, and/or accepting the one or more schedules with manual adjustments.

Figure 4:
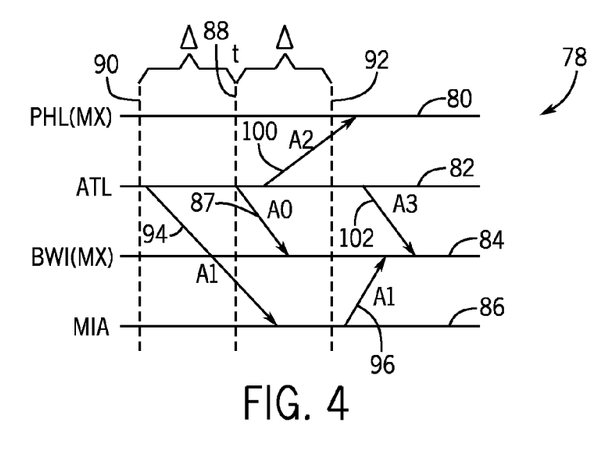
FIG. 4 is a diagram of an embodiment of a pre-maintenance aircraft swap.

FIG. 4 is a diagram of an embodiment of a pre-maintenance aircraft swap 78. During a pre-maintenance aircraft swap, move-up aircraft are identified before a maintenance event occurs. For example, suppose that A0 represents a disrupted aircraft. For a flight leg f whose departure time is t from a given location l, the interval [t−Δ, t+Δ] is examined for a user-defined value Δ≥0. A move-up aircraft A1 is identified if: it contains a flight departing from l in the interval [t−Δ, t+Δ], and it travels to an eligible maintenance location before the latest allowable maintenance start time for the disrupted aircraft A0.

The illustrated embodiment includes the following airports: Philadelphia, Pa.—International (PHL) 80 which is a maintenance location (mx), Atlanta, Ga. (ATL) 82, Baltimore, Md. (BWI) 84 which is also a maintenance location (mx), and Miami, Fla.—International (MIA) 86. The aircraft A0 is a disrupted aircraft and the flight includes a first leg 87 departing ATL 82 at a time t 88. A time interval t−Δ 90 is illustrated, and a time interval t+Δ 92 is illustrated. Three aircraft A1, A2, and A3 also have flights departing from ATL 82. Aircraft A1 is an eligible move-up aircraft for A0 because its departure leg 94 is contained within the time intervals 90 and 92, and aircraft A1 travels to a maintenance location BWI 84 on its second flight leg 96 from ATL 82. Similarly, aircraft A2 is an eligible move-up aircraft because its departure leg 100 is contained within the time intervals 90 and 92, and aircraft A2 travels to a maintenance location PHL 80 on its departure leg 100 from ATL 82. In contrast, aircraft A3 is not an eligible move-up aircraft because its departure leg 102 is not within the time intervals 90 and 92, even though it travels to the maintenance location BWI 84. As may be appreciated, all possible move-up aircraft may be identified using a pre-maintenance aircraft swap, and an estimated cost of making such a swap may be identified. The estimated swap cost may include the direct delay incurred for each aircraft at the location of the swap, in addition to any propagated delay costs. The estimated swap cost may also include other metrics considering route integrity and other user-specified criteria.

Figure 5:
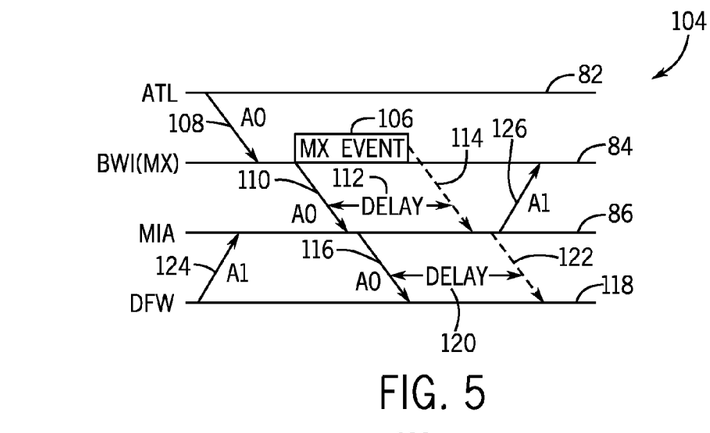
FIG. 5 is a diagram of an embodiment of a maintenance delay.

FIG. 5 is a diagram of an embodiment of a maintenance delay 104. A maintenance event 106 causes a delay to an aircraft A0. Specifically, during a first leg 108, the aircraft A0 travels from ATL 82 to BWI 84. A second flight leg 110 gets delayed by a delay time 112 because the maintenance event 106 is still being completed while the second flight leg 110 is supposed to depart BWI 84 to MIA 86. Accordingly, a revised second flight leg 114 illustrates a departure from BWI 84 that occurs after the maintenance event 106 is completed. Furthermore, because the second flight leg 110 is delayed, a third flight leg 116 from MIA 86 to Dallas/Fort Worth, Tex. (DFW) 118 is also delayed. The third flight leg 116 gets delayed by a delay time 120 due to the change in arrival time from the revised second flight leg 114. Accordingly, a revised third flight leg 122 illustrates a departure from MIA 86 that occurs after the revised second flight leg 114 arrives at MIA 86. An aircraft A1 is also illustrated. The aircraft A1 has a first leg 124 where it travels from DFW 118 to MIA 86. Moreover, the aircraft A1 has a second leg 126 where it travels from MIA 86 to BWI 84.

Figure 6:
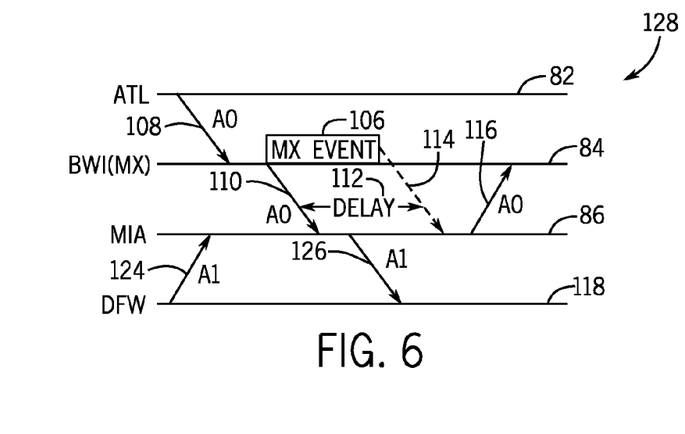
FIG. 6 is a diagram of an embodiment of a post-maintenance aircraft swap resulting from a maintenance delay.

FIG. 6 is a diagram of an embodiment of a post-maintenance aircraft swap 128 resulting from the maintenance delay 104. In this embodiment, a swap is scheduled after the maintenance event 106 commences. A swap may occur after a maintenance event commences as long as a disrupted aircraft travels to an eligible maintenance location on its original route. As illustrated, the second leg 126 of the aircraft A1 is swapped to travel from MIA 86 to DFW 118 to reduce the delay caused by the maintenance event 106. Furthermore, the second leg 116 of the aircraft A0 is changed to travel from MIA 86 to BWI 84. Thus, an aircraft swap occurs after the start of the maintenance event 106.

Technical effects of the invention include determining which aircraft components to repair and/or replace, and scheduling an unscheduled maintenance event timely to repair the aircraft. The unscheduled maintenance event is scheduled using a maintenance scheduling system 16 that enhances the scheduling based on user provided preferences, thereby reducing operational costs. Accordingly, the maintenance scheduling system 16 may facilitate a reduction in airline expenses by reducing emergency maintenance procedures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for scheduling at least one unscheduled maintenance event for at least one aircraft, comprising:
   receiving, via at least one processor, an indication that the at least one unscheduled maintenance event for the at least one aircraft is to be scheduled;
   receiving, via the at least one processor, an initial flight schedule for the at least one aircraft;
   receiving, via the at least one processor, an initial aircraft schedule for the at least one aircraft;
   receiving, via the at least one processor, at least one selectable parameter indicative of user preferences;
   determining, via the at least one processor, a maintenance schedule for completing the at least one unscheduled maintenance event on the at least one aircraft, a modified flight schedule for the at least one aircraft, and a modified aircraft schedule for the at least one aircraft based on the at least one unscheduled maintenance event, the initial flight schedule, the initial aircraft schedule, and the at least one selectable parameter to reduce a total cost of operating the at least one aircraft; and
   providing the maintenance schedule for completing the at least one unscheduled maintenance event, the modified flight schedule for the at least one aircraft, and the modified aircraft schedule for the at least one aircraft to a user interface, wherein receiving the at least one selectable parameter comprises receiving at least one of a flight cancellation cost parameter, a flight delay cost parameter, a ferry flight cost parameter, a spare aircraft cost parameter, a flight diversion cost parameter, and a connection time parameter.

2. The method of claim 1, wherein receiving the indication that the at least one unscheduled maintenance event is to be scheduled comprises receiving a probability for performing the at least one unscheduled maintenance event as a function of time, a number of flight cycles, a number of flight hours, or some combination thereof.

3. The method of claim 1, wherein determining the maintenance schedule for completing, the at least one unscheduled maintenance event, the modified flight schedule for the at least one aircraft, and the modified aircraft schedule for the at least one aircraft comprises reducing at least one of an aggregate delay of aircraft routes, a number of flight cancellations, a number of swaps in a route, a number of unassigned aircraft, a number of unassigned maintenance events, a number of missed crew connections, and a number of missed passenger connections.

4. The method of claim 1, wherein determining the maintenance schedule for completing the at least one unscheduled maintenance event, the modified flight schedule for the at least one aircraft, and the modified aircraft schedule for the at least one aircraft comprises at least one of assigning each flight within the initial flight schedule to one route, assigning one route to each aircraft within the initial aircraft schedule, limiting a total number of departures based on a departure restriction threshold, limiting a total number of arrivals based on an arrival restriction threshold, limiting a total number of grounded aircraft based on a gate restriction threshold, and limiting a total number of operations based on a curfew restriction.

5. A method of for scheduling at least one unscheduled maintenance event for at least one aircraft, comprising:
   receiving, via at least one processor, an indication that the at least one unscheduled maintenance event for the at least one aircraft is to be scheduled;
   receiving, via the at least one processor, an initial flight schedule for the at least one aircraft;
   receiving, via the at least one processor, an initial aircraft schedule for the at least one aircraft;
   receiving, via the at least one processor, at least one selectable parameter indicative of user preferences, wherein receiving the at least one selectable parameter comprises receiving at least one of a beginning of a time window and an end of the time window;
   determining, via the at least one processor, a maintenance schedule for completing the at least one unscheduled maintenance event on the at least one aircraft, a modified flight schedule for the at least one aircraft, and a modified aircraft schedule for the at least one aircraft based on the at least one unscheduled maintenance event, the initial flight schedule, the initial aircraft schedule, and the at least one selectable parameter to reduce a total cost of operating the at least one aircraft, wherein determining the maintenance schedule for completing the at least one unscheduled maintenance event, the modified flight schedule for the at least one aircraft, and the modified aircraft schedule for the at least one aircraft comprises determining a first set of aircraft on which the at least one unscheduled maintenance event is to be performed between the beginning and the end of the time window and determining a second set of aircraft to change a flight schedule with the first set of aircraft, to change an aircraft schedule with the first set of aircraft, or some combination thereof;
   providing the maintenance schedule for completing the at least one unscheduled maintenance event, the modified flight schedule for the at least one aircraft, and the modified aircraft schedule for the at least one aircraft to a user interface; and
   estimating a cost to change the flight schedule with the first set of aircraft, to change the aircraft schedule with the first set of aircraft, or some combination thereof.

6. The method of claim 5, wherein determining the maintenance schedule for completing the at least one unscheduled maintenance event, the modified flight schedule for the at least one aircraft, and the modified aircraft schedule for the at least one aircraft comprises filtering out flight schedule events from the flight schedule that terminate before the beginning of the time window, and filtering out flight schedule events from the flight schedule that begin after the end of the time window.

7. The method of claim 5, wherein determining the maintenance schedule for completing the at least one unscheduled maintenance event, the modified flight schedule for the at least one aircraft, and the modified aircraft schedule for the at least one aircraft comprises filtering out aircraft schedule events from the aircraft schedule that terminate before the beginning of the time window, and filtering out aircraft schedule events from the aircraft schedule that begin after the end of the time window.

8. An apparatus, comprising:
   at least one non-transitory computer-readable media having instructions encoded thereon for execution by a processor, the instructions comprising:

instructions to receive an indication that at least one unscheduled maintenance event for at least one aircraft is to be scheduled;

instructions to receive an initial flight schedule for the at least one aircraft;

instructions to receive an initial aircraft schedule for the at least one aircraft;

instructions to receive at least one selectable parameter indicative of user preferences;

instructions to determine a maintenance schedule for completing the at least one unscheduled maintenance event, a modified flight schedule for the at least one aircraft, and a modified aircraft schedule for the at least one aircraft based on the at least one unscheduled maintenance event, the initial flight schedule, the initial aircraft schedule, and the at least one selectable parameter to reduce a total cost of operating the at least one aircraft, wherein the instructions to determine the maintenance schedule for completing the at least one unscheduled maintenance event, the modified flight schedule for the at least one aircraft, and the modified aircraft schedule for the at least one aircraft comprise instructions to determine a first set of aircraft on which the at least one unscheduled maintenance event is to be performed and to determine a second set of aircraft to change a flight schedule with the first set of aircraft, to change an aircraft schedule with the first set of aircraft, or some combination thereof;

instructions to provide the maintenance schedule for completing the at least one unscheduled maintenance event, the modified flight schedule for the at least one aircraft, and the modified aircraft schedule for the at least one aircraft to a user interface, wherein the instructions to determine the maintenance schedule for completing the at least one unscheduled maintenance event, the modified flight schedule for the at least one aircraft, and the modified aircraft schedule for the at least one aircraft comprise instructions to determine a set of potential flight routes for the first and second sets of aircraft.

9. The apparatus of claim 8, wherein the instructions to determine the maintenance schedule for completing the at least one unscheduled maintenance event, the modified flight schedule for the at least one aircraft, and the modified aircraft schedule for the at least one aircraft comprise instructions to estimate a cost for the set of potential flight routes.

* * * * *